United States Patent Office 3,451,966
Patented June 24, 1969

3,451,966
POLYCARBONATE-CARBAMATES OF ALKYL-IDENE DIPHENOLS AND DIHYDROXYDI-PHENYL SULFONES
James T. Gregory and Arthur B. Robertson, Akron, and William A. Keim, Barberton, Ohio, assignors to PPG Industries Inc., Pittsburgh, Pa., a corporation of Pennsylvania
No Drawing. Filed Nov. 8, 1966, Ser. No. 592,731
Int. Cl. C08g 20/30
U.S. Cl. 260—49                    7 Claims

ABSTRACT OF THE DISCLOSURE

Polycarbonate-carbamate polyesters of (a) alkylidene diphenols, (b) dihydroxydiphenyl sulfones, (c) carbonic acid, and (d) biscarbamate acids possess enhanced resistance to solvent stress cracking. These polyesters contain more alkylidene diphenol moieties than sulfone moieties, usually in ratios of from 3 to 15 to 1 and at least twice as many carbonate as carbamate groups.

---

This invention deals with aromatic mixed polycarbonate resins. More particularly, it concerns alkylidene diphenol polycarbonate-carbamate resins and their preparation.

According to this invention, polycarbonate-carbamate resins are provided which, among other things, evidence unusual and outstanding resistance to solvent stress cracking. In this property, the polymers of this invention are distinguishable from older aromatic polycarbonates such as the polycarbonates of Bisphenol A (para,para'-isopropylidene diphenol) described in United States Letters Patent No. 3,028,365.

Mixed copolyesters of this invention include in their polymer chain moieties of (a) an alkylidene diphenol, (b) carbonic acid, (c) a biscarbamic acid, and (d) a dihydroxydiphenyl sulfone. Their general structure, therefore, can be represented as being composed of the following principal configurations:

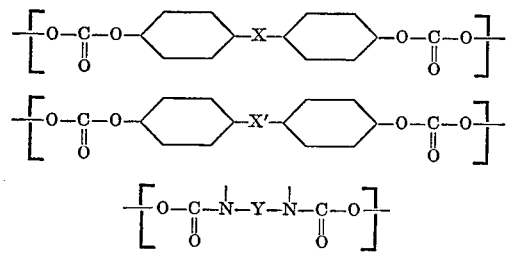

wherein X is an alkylidene and X' is a sulfone (SO$_2$) or polysulfone linking radical between a pair of phenyl radicals and Y is the linking radical between a pair of nitrogen atoms of a theoretical biscarbamic acid:

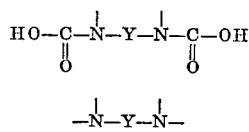

being the residue of a diamine, preferably a secondary diamine, i.e., an amine having a pair of imino groups.

In the resins of this invention, the ratio of alkylidene diphenol moieties to dihydroxydiphenyl sulfone moieties is such that the alkylidene diphenol moieties are in excess of the sulfone moieties. Thus, the ratio of alkylidene diphenol to the sulfone moieties is greater than one to one, more usually in the more preferred resin on the order of between 3 and 12 to 1. Resins of this invention with somewhat higher ratios of alkylidene diphenol (up to 15 to 1) also are acceptable.

Further, the preferred resins contain considerably more carbonate groups

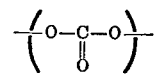

than carbamate groups

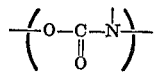

Resins of this invention will contain a minimum of at least twice as many carbonate as carbamate groups. The more preferred resins contain carbonate groups from 5 to 25 times the frequency of the carbamate groups. One such group of resins contains 2 to 20 carbonate groups per carbamate group.

The exact arrangement of the various moieties in the linear chain of the contemplated polycarbonate-carbamate resins can be varied, depending upon the particular method employed in the manufacture thereof. In one such procedure, between 3 and 12 moles of an alkylidene bisphenol, notably Bisphenol A, per mole of dihydroxy diphenyl sulfone is phosgenated by the addition of phosgene to a liquid reaction medium containing the mixture of the two diphenols in a suitable organic solvent (for the product resin) such as methylene chloride or other partially chlorinated methane or ethane, water and sufficient alkali such as sodium hydroxide, usually at temperatures below or near the normal boiling point of the solvent. This phosgenation is conducted so as to provide for a bischloroformate of the diols linked together by carbonate linkages, or in other words, a low molecular weight chloroformate terminated polycarbonate containing in its polymer chain moieties of both the alkylidene bisphenol and dihydroxydiphenyl sulfone. Such bischloroformate prepolymer is then reacted with an appropriate diamine typified by piperazine, thereby incorporating in the polymer chain carbamate linkages and the diamine moiety.

Depending upon how the alkylidene bisphenol and dihydroxydiphenyl sulfone are subjected to phosgenation and incorporated in the prepolymer (intermediate lower molecular weight product), the relationship of these two respective moieties will vary. The dihydroxysulfone can be phosgenated initially in the absence of alkylidene bisphenol to provide a bischloroformate of the sulfone moiety or a plurality of sulfone moieties linked to one another by carbonate groups) which upon reaction with alkylidene bisphenol and additional phosgene results in a low molecular weight prepolymer terminated with chloroformate groups linked directly to alkylidene bisphenol moieties. Upon reaction of this prepolymer with diamine, the thermoplastic linear polymer which is provided is one having its carbamate linkages linked directly to the alkylidene bisphenol moieties with the dihydroxy diaryl sulfone moieties being spaced from the carbamate linkages by one or more, usually a plurality, of alkylidene bisphenol moiety. Such a polymer has a characterizing structure which is illustrated by this formula:

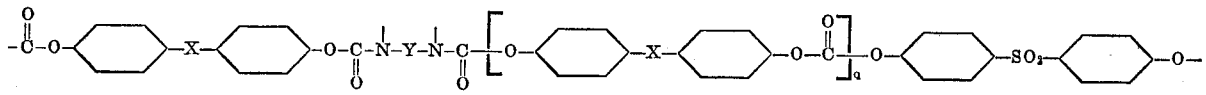

wherein X is an alkylidene linking group, Y is a bridging group between a pair of amine nitrogens as hereinbefore detailed and $q$ is a value of one or more.

Alternatively, a more random distribution of the dihydroxydiaryl sulfone and alkylidene diphenol carbonate linkages can be achieved by phosgenating a mixture containing both alkylidene bisphenol and dihydroxydiaryl sulfone. So provided prepolymer chloroformate has its sulfone and alkylidene diphenol moieties distributed at random. Upon reaction with the diamine, the polymer has at least some dihydroxy diaryl sulfone moieties (albeit but a minor portion) of the moieties linked directly to the nitrogen (i.e., directly linked to the carbamate group). These more random polymers will differ struturally from those immediately hereinbefore described in that at least some of the carbamate linkages will have the dihydroxydiaryl sulfone linked directly thereto.

Under the normal conditions of phosgenation, the alkylidene bisphenol is more reactive than the dihydroxydiphenyl sulfone in the formation of carbonate and chloroformate linkages. This coupled with the greater concentration of alkylidene bisphenol (normally present to provide for about from 3 to 12 times the number of its moieties compared with moieties of dihydroxydiaryl sulfone) favors products in which the alkylidene bisphenol moieties are directly linked to the carbamate group. Unless special steps are taken to accentuate those conditions which would favor the provision of linkages in which the sulfone moiety is linked to a carbamate group few such groupings are likely to be in the polymer.

A further variation in the configuration of polycarbonate-carbamate dihydroxydiaryl sulfone modified polymers of the present invention is provided by a procedure wherein a bischloroformate prepolymer of alkylidene bisphenol is provided (that is, a low molecular weight bischloroformate of a polycarbonate of the alkylidene bisphenol). Such chloroformate typically has the following structure:

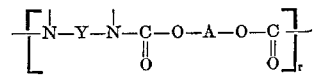

wherein $p$ is a value usually of from 6 to 20. Upon reaction of this bischloroformate with a stoichiometric excess of dihydroxydiphenyl sulfone (more than one, usually up to 2 moles of sulfone per mole equivalent of bischloroformate), an intermediate or low molecular weight polymer having dihydroxydiaryl sulfone end groups can be attained. Phosgenation thereof to form a bischloroformate and further reaction with diamine (or direct reaction with a diisocyanate when carbamate linkages of primary amines can be tolerated) gives rise to products in which the carbamate groups are primarily attached directly to moieties of the dihydroxydiaryl sulfone, such as illustrated by the following configurations:

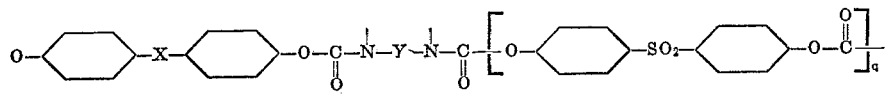

and/or

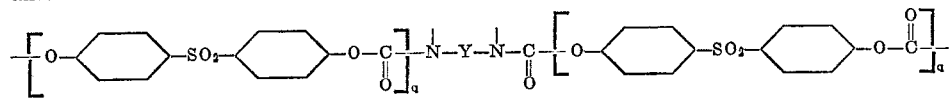

where X, Y and $q$ are as before defined.

Yet another variation in the chain of the contemplated linear thermoplastic carbonate-carbamate copolymer of alkylidene bisphenols and dihydroxydiaryl sulfones is the provision therein of polyurethane blocks of either or both these two diphenols. Thus, one group of the resins of this invention have polyurethane blocks in the chain which may be represented as:

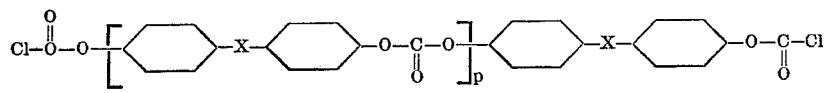

wherein Y is a residue of a diamine, A is either a dihydroxydiphenyl sulfone or alkylidene bisphenol residue or both and $r$ is a value of 2 or more, rarely above 10. Polyurethane blocks are provided by reacting a substantially equimolecular proportion of bischloroformate of the diphenol. A stoichiometric excess of either diamine or bischloroformate is employed to limit the chain length of the polyurethane segment. The resulting product is then reacted with diphenol and phosgene.

Formation of the carbamate groups in the polymers of the present invention, of course, is not necessarily limited to the reaction of amine groups (having a reactive hydrogen) with chloroformate groups but obviously can be provided by other known reactions for forming carbamate (or urethane) groups including, for example, the reaction of a hydroxy group with an isocyanate group, thus giving rise to a urethane (carbamate) group. This route does not directly give urethane groups which are free of hydrogens linked directly to their nitrogens. It is, therefore, unsuited for the direct preparation of the preferred polymers of the present invention in which the carbamate groups are provided from secondary diamines, or in other words, have carbamate groups in which the carbamate nitrogen is free from hydrogen atoms directly attached thereto. Such polymers are more stable thermally than polymers in which the carbamate nitrogen is linked to a hydrogen, rendering these preferred resins especially suitable for molding applications in which the polymer is heated, for example, injection molding.

The following examples illustrate the manner in which the present invention may be practiced:

EXAMPLE I

Using this procedure, a series of polyester resins illustrative of the resins of this invention were prepared.

A glass reaction flask equipped with a stirrer was charged with 529.2 grams of aqueous sodium hydroxide containing 6.725 moles of NaOH and 1700 milliliters of distilled water. To the solution a total of 0.4 gram of sodium dithionate was added in two equal steps following which 6.85 grams of solid phenol were added. With this liquid kept free of oxygen by nitrogen purging, a total of 2.0 moles of Bisphenol A and dihydroxydiphenyl sulfone (in the mole ratio set forth in the table hereinafter) and 1200 milliliters of methylene chloride were charged.

With the reaction medium being stirred and maintained at about 25° C. (23°–30° C.), 4.06 grams of phosgene per minute were fed until a total of 276.1 grams of phosgene had been added. A total of 0.2 mole of piperazine was then added while vigorously stirring the medium as an aqueous solution of 17.23 grams of piperazine in 150 milliliters of water. Cooling and control of the addition rate was practiced to avoid a violent reaction.

One hour after concluding the addition of phosgene, 0.83 gram of triethylamine in 100 milliliters of water was added to the flask. Subsequently, enough aqueous sodium hydroxide was added to complete hydrolysis of any chloroformate chlorine.

The polymer is then recovered by decanting the aqueous layer, washing the remaining organic layer, partially concentrating the washed solution to about 4 liters in volume, diluting with an equal volume of hexane to effect polymer precipitation, separating and grinding the precipitated polymer, drying under vacuum and finally extruding.

These polymers were then tested for their resistance to stress cracking in carbon tetrachloride and gasoline, following the test procedure described in SPE Journal, June 1962, on pages 667 to 670, in an article entitled "Stress Cracking of Rigid Thermoplastics" by R. L. Bergen, Jr.

The table lists the ratio of ingredients charged (and incoporated in the polymer) and the stress cracking values ($S_c$) obtained for the resin:

stress cracking, good impact strength, these thermoplastic resins are effectively injection molded into products which are useful under the hood of an automobile, such as a carburetor housing.

In lieu of para,para'-isopropylidene diphenol (Bisphenol A), other alkylidene diphenols alone or in admixture may be employed to attain the herein contemplated polymers. As a rule, the preferred diphenols are ones in which the alkylidene group is a hydrocarbon or halohydrocarbon group of up to 10 carbon atoms, more notably 1 to 5 carbon atoms. Among these may be mentioned the following:

(4,4'-dihydroxydiphenyl)methane
1,1-(4,4'-dihydroxydiphenyl)cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
1,1-(4,4'-dihydroxy-3,3'-dimethyl diphenyl)cyclohexane
2,2-(2,2'-dihydroxy-4,4'-di-tert-butyl diphenyl)propane
3,4-(4,4'-dihydroxydiphenyl)hexane
1,1-(4,4'-dihydroxydiphenyl)-1-phenyl ethane
2,2-(4,4'-dihydroxydiphenyl)butane
2,2'-(4,4'-dihydroxydiphenyl)pentane

TABLE.—POLYMER COMPOSITION (MOLE PERCENT)

| Polymer | Charged | | | Found | | | Stress cracking $S_v$, p.s.i. | |
|---|---|---|---|---|---|---|---|---|
| | BPA | Sulfone | Pip | BPA | Sulfone | Pip | CCl₄ | Gasoline |
| A | 85.9 | 5.0 | 9.1 | 90.7 | 1.9 | 7.4 | 460 | 1,800 |
| B | 80.0 | 10.0 | 10.0 | 84.1 | 7.1 | 8.8 | 645 | 2,580 |
| C | 70.0 | 20.0 | 10.0 | 75.7 | 13.4 | 10.9 | 1,730 | 3,860 |
| D | 75.0 | 15.0 | 10.0 | 74.5 | 15.7 | 9.8 | 1,900 | 3,600 |
| E | 65.0 | 25.0 | 10.0 | 72.7 | 18.0 | 9.3 | 2,870 | 5,200 |
| F | 65.0 | 25.0 | 10.0 | 69.4 | 20.7 | 9.9 | ¹4,000 | 4,550 |

¹ Did not crack but crazed between 4,000–5,000 p.s.i.
BPA=para,para'-isopropylidene diphenol; Sulfone=para,para'-di(hydroxyphenyl)sulfone; Pip=piperazine.

These values demonstrate the high degree of polymer resistance to solvent stress cracking and are strikingly greater than those of carbonate-carbamate copolymers of two of the three components at comparable mole concentrations.

EXAMPLE II

Following the general procedure of Example I, a reaction flask was charged with 182 grams of 50.5 percent aqueous NaOH (2.3 moles), 63.6 grams (0.6 mole) of sodium carbonate, 900 milliliters of water, 0.4 gram of sodium dithionate, 2.29 grams of phenol, 178 grams (0.78) of Bisphenol A and 600 milliliters of methylene chloride. While agitating the mixture and with it at about 27° C., 104 grams (1.10 moles) of phosgene were fed at the rate of 2.32 grams per minute. Thereafter, a solution made up of 57.5 grams (0.23 mole) dihydroxydiphenyl sulfone, 0.2 gram sodium dithionate, 84.8 grams of sodium carbonate, 30 grams of 50 percent NaOH (0.37 mole NaOH) and enough distilled water to give a total volume of 800 milliliters was added to the reaction flask. Phosgene addition was then again commenced until an additional 30.4 grams (0.307 mole) had been added so that a total of 134.4 grams of phosgene for the whole preparation had been added.

The requisite amount of piperazine (about 0.1 mole) was then added as a dilute aqueous solution and 600 milliliters of methylene chloride were also added. Small amounts of triethylamine were added in several steps as was some sodium hydroxide.

By virtue of the order in which the alkylidene bisphenol and dihydroxydiphenyl sulfone were added and reacted, this polymer will have a considerable portion of its sulfone moieties linked to the carbamate groups of the polymer. Tested by the procedure specified in Example I, this polymer had an $S_c$ in gasoline of 3600 p.s.i. and 2160 in carbon tetrachloride.

Because of their high degree of resistance to solvent 3,3'-(4,4'-dihydroxydiphenyl)pentane
2,2'-(4,4'-dihydroxydiphenyl)-3-methyl butane
2,2'-(4,4'-dihydroxydiphenyl)hexane
2,2'-(4,4'-dihydroxydiphenyl)-4-methyl pentane
2,2'-(4,4'-dihydroxydiphenyl)heptane
4,4-(4,4'-dihydroxydiphenyl)heptane
2,2-(4,4'-dihydroxydiphenyl)tridecane
2,2-bis(3,5-dichloro-4-hydroxyphenyl)propane
2,2-bis(tetrachlorohydroxyphenyl)propane
2,2-bis(3-chloro-4-hydroxyphenyl)propane Dihydroxy diaryl sulfones other than 4,4'-dihydroxydiphenyl sulfone (bis(para-hydroxyphenyl)sulfone) can be employed in lieu of or in admixture with that sulfone to give rise to highly desirable polyesters. Among the dihydroxydiphenyl sulfones which as a class can be so used there may be mentioned 2,4'-dihydroxydihpenyl sulfone, 5'-chloro-2,4'-dihydroxydihpenyl sulfone, 5'-chloro-2',4-dihydroxydiphenyl sulfone) 5'-chloro-2',4-dihydroxydiphenyl sulfone, 3'-chloro-4,4'-dihydroxydiphenyl sulfone, bis(4-hydroxyphenyl(biphenol disulfone as well as other sulfones which contain further substituents on the phenyl groups, notably alkyl, alkylol, nitro and halogens such as chlorine, fluorine and bromine. Polysulfones, notably disulfones such as bis(4-hydroxyphenyl)biphenyl disulfone and the like can be used.

The foregoing examples illustrate polycarbonate-carbamate-sulfone polymers which possess outstanding resistance to solvent stress cracking and, furthermore, are especially resistant to both hydrolytic and thermal decomposition or deterioration. Other such linear thermoplastic polycarbonate-carbamate-sulfone products are provided by using in lieu of piperazine described in the foregoing examples other diamines, for example, 2-methyl piperazine, 2,5-dimethyl piperazine, 2,6-dimethyl piperazine and other lower alkyl substituted piperazines. Other diamines containing a pair of imino groups that is, amino nitrogens having one hydrogen linked directly thereto,

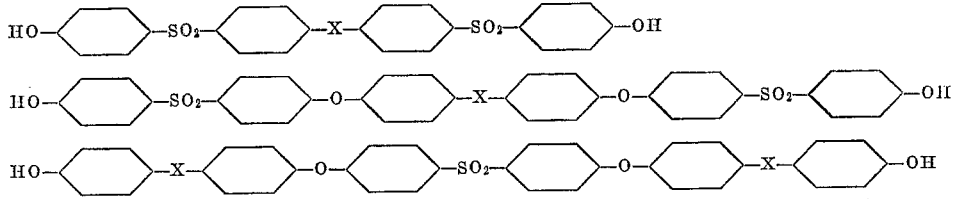

including diamines which conform with the structure of the following formula:

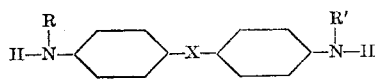

wherein X is typically a hydrocarbon radical or substituted divalent hydrocarbon radical which usually contains up to 8 carbon atoms (and rarely more than 15) and R and R' are substituents other than hydrogen, more usually lower alkyl groups of 1 to 6 carbons, such as methyl, ethyl, isopropyl or butyl alkyl groups. Many of these secondary diamines may be prepared, as the literature rceognizes, by reaction of an N-alkyl aniline such as N-methyl aniline with an aldehyde such as formaldehyde, butylaldehyde and like aldehydes containing up to 8 or more carbon atoms or a ketone such as acetone, methyl ethyl ketone, diethyl ketone or like ketones including cyclic ketones such as cyclohexanone and bridged cyclic ketones containing up to 8 or more carbon atoms.

Primary diamines may be used to produce thermoplastic resins within the contemplation of the present invention. However, the thermal stability of these resins is significantly less than those derived from secondary amines such as piperazine. Thus, the preferred mixed polycarbonate-carbamate esters of the present invention cannot be prepared directly by reaction of a diisocyanate, for example, with a bisphenol because such reaction would lead directly to a carbamate group bearing a hydrogen atom on the nitrogen of the carbamate. It is, of course, possible to treat such carbamate groups to replace the hydrogen. Also these hydrogen bearing carbamate nitrogens may be cross-linked as by urea linkages (reaction with isocyanate groups) to give less thermoplastic even thermoset or highly three dimensional products. Thus, carbamate groups derived from primary diamines such as the aliphatic diamines typified by methylene diamine, hexamethylene diamine, propylene diamine, tetramethylene diamine, 4,4'-diamino-dicyclohexamethane, diaminobenzophenone, N-phenylene diamine, ortho-toluylene, meta-tolylene and the like can be present. If present in small enough proportion to carbamates of secondary amines the polymers will have sufficient thermal stability.

Moreover, the polycarbonate-carbamate-sulfone type resins of this invention need not be restricted solely to preparation from an alkylidene bisphenol, a diamine, a carbonic acid precursor such as phosgene or chloroformate and a dihydroxy diaryl sulfone. They may contain still other dihydric components and other dibasic acid components. Thus, a portion of the alkylidene bisphenol may be replaced by dihydric alcohols of the glycol character such as ethylene glycol, diethylene glycol, 1,3-propane glycol, 1,4-butane glycol, resorcinol, hydroquinone, thiodiglycol, phthalyl alcohol, dihydroxydiphenyl, dihydroxydiphenyl ether and the like. Additionally, a portion of the dibasic acid moieties provided by the carbonic acid precursor or biscarbamic acid may be replaced by other difunctional acidic reagents, most notably dibasic acids such as maleic, phthalic, terephthalic, isophthalic and the like.

Other diphenolics which may be used include compounds such as:

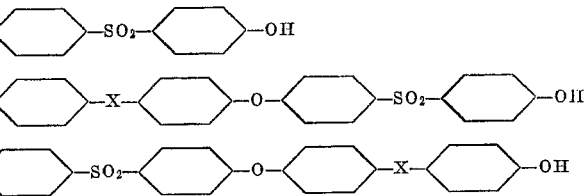

wherein X is an alkylidene group such as propylidene.

In lieu of the methods described for preparing these resins, other recognized techniques for forming carbonate linkages from phenolic hydroxyls and phosgene can be utilized. For example, the bisphenols (including sulfones) can be phosgenated in an anhydrous medium to form the prepolymer chloroformate carbonate for reaction with diamine. Diphenyl carbonate and lower alkyl esters of diphenol carbonates can by heating and interesterification be reacted to also give rise to polycarbonate prepolymers which can be phosgenated and reacted with diamines.

While the present invention has been described with reference to specific embodiments, it is not intended that it be construed as limited to such embodiments and details thereof except and to the extent that these such details are set forth in the appended claims.

We claim:
1. A mixed polycarbonate-carbamate resin of (a) an alkylidene diphenol, (b) a dihydroxydiphenyl sulfone, (c) carbonic acid, and (d) a biscarbamic acid containing from 3 to 15 alkylidene diphenol moieties per dihydroxydiphenyl sulfone moiety and at least twice as many carbonate groups as carbamate groups.
2. The resin of claim 1 containing from 2 to 25 carbonate groups per carbamate group.
3. The resin of claim 1 wherein the biscarbamic acid is a biscarbamic of a secondary diamine.
4. A substantially linear thermoplastic polycarbonate-carbamate ester of high resistance to solvent stress cracking comprising the polyester of (a) para,para'-isopropylidene diphenol, (b) 4,4'-dihydroxydiphenyl sulfone, (c) carbonic acid, and (d) a diamine selected from piperazine and lower alkyl substituted piperazines containing from 3 to 12 moieties of the para,para'-isopropylidene diphenol per moiety of dihydroxydiphenyl sulfone and from 2 to 20 carbonate groups per carbamate group.
5. The polycarbonate-carbamate of claim 4, wherein the diamine is piperazine.
6. A substantially linear thermoplastic polycarbonate-carbamate polymer of high resistance to solvent stress cracking comprising a polyester of (a) an alkylidene diphenol, (b) a dihydroxydiphenyl sulfone, (c) carbonic acid, and (d) a biscarbamic acid of a secondary diamine containing from 3 to 12 moieties of the alkylidene diphenol per moiety of dihydroxydiphenyl sulfone and from 2 to 25 carbonate groups per carbamate group.
7. The polyester of claim 6 containing 2 to 20 carbonate groups per carbamate group.

References Cited

UNITED STATES PATENTS

| | | | |
|---|---|---|---|
| 2,731,445 | 1/1956 | Wittbecker | 260—47 |
| 2,962,470 | 11/1960 | Jung | 260—45.4 |
| 3,251,803 | 5/1966 | Caldwell et al. | 260—47 |

WILLIAM H. SHORT, *Primary Examiner.*

M. GOLDSTEIN, *Assistant Examiner.*

U.S. Cl. X.R.

260—33.8, 47